(12) United States Patent
Tanaka et al.

(10) Patent No.: US 6,770,387 B2
(45) Date of Patent: Aug. 3, 2004

(54) MAGNETO-OPTICAL RECORDING MEDIUM AND METHOD OF REPRODUCING THE SAME

(75) Inventors: Tsutomu Tanaka, Kawasaki (JP); Motonobu Mihara, Kawasaki (JP); Ken Tamanoi, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 155 days.

(21) Appl. No.: 10/004,726

(22) Filed: Dec. 5, 2001

(65) Prior Publication Data

US 2002/0119347 A1 Aug. 29, 2002

Related U.S. Application Data

(63) Continuation-in-part of application No. 09/809,475, filed on Mar. 15, 2001.

(30) Foreign Application Priority Data

Oct. 26, 2000 (JP) ........................................ 2000-327155

(51) Int. Cl.$^7$ ........................... G11B 5/62; G11B 7/005; H01F 10/16; H01F 10/30
(52) U.S. Cl. ....................... 428/694 RE; 428/694 MM; 369/13.41; 369/13.45; 369/13.46
(58) Field of Search .................. 428/694 ML, 694 SC, 428/694 RE, 694 MM; 369/13.41, 13.45, 13.46

(56) References Cited

U.S. PATENT DOCUMENTS

| | | | | |
|---|---|---|---|---|
| 5,662,988 A | * | 9/1997 | Nakayama et al. | 428/212 |
| 5,723,227 A | * | 3/1998 | Matsumoto et al. | 428/694 ML |
| 6,117,544 A | * | 9/2000 | Hirokane et al. | 428/336 |
| 2002/0081459 A1 | * | 6/2002 | Tanaka | 428/694 ML |

FOREIGN PATENT DOCUMENTS

| | | |
|---|---|---|
| JP | 03-093056 | 4/1991 |
| JP | 3093058 | 4/1991 |
| JP | 4271039 | 9/1992 |
| JP | 5-012731 | 1/1993 |
| JP | 7-244877 | 9/1995 |
| JP | 11143041 | 5/1999 |

* cited by examiner

Primary Examiner—Paul Thibodeau
Assistant Examiner—Nikolas J. Uhlir
(74) Attorney, Agent, or Firm—Greer, Burns & Crain, Ltd.

(57) ABSTRACT

A magneto-optical recording medium comprising four magnetic layers including a mask layer, a reproduction layer, an intermediate layer and a recording layer, wherein the reproduction layer and the recording layer each have a direction of easy magnetization extending in a layer stacking direction at room temperature, the mask layer and the intermediate layer each have a direction of easy magnetization extending in an in-plane direction at room temperature, the mask layer, the reproduction layer, the intermediate layer and the recording layer have Curie temperatures $Tc1$, $Tc2$, $Tc3$ and $Tc4$, respectively, which satisfy relationships of $Tc3<Tc2$, $Tc3<Tc4$ and $Tc3<Tc1$, and the intermediate layer is a rare-earth-rich magnetic layer.

11 Claims, 16 Drawing Sheets

MAGNETO-OPTICAL RECORDING MEDIUM AND METHOD OF REPRODUCING THE SAME

This is a continuation-in-part of application Ser. No. 09/809,475, filed Mar. 15, 2001.

CROSS-REFERENCE TO RELATED APPLICATION

This application is related to Japanese application No. 2000-327155 filed on Oct. 26, 2000, whose priority is claimed under 35 USC §119, the disclosure of which is incorporated by reference in its entirety.

BACKGROUND OF THE INVENTION

1. Field of the Invention

The present invention relates to a magneto-optical recording medium to be embodied as a magneto-optical disk, a magneto-optical tape, a magneto-optical card or the like for use with a magneto-optical recording/reproducing apparatus, and method of reproducing the same.

2. Description of the Related Art

In recent years, magneto-optical recording media have come into limelight as external recording devices for computers. Such a magneto-optical recording medium, which is adapted to form submicron recording bits thereon by application of an external magnetic field and a laser beam, has a greater recording capacity than conventional types of external recording media such as floppy disks and hard disks.

A currently available 3.5-inch magneto-optical recording medium, for example, has 1.1-$\mu$m pitch tracks provided on an area thereof defined between 24-mm radius and 40-mm radius concentric circles, and is adapted to circumferentially write marks of a minimum size of 64 $\mu$m to provide a recording capacity of about 640 MB on each side thereof. The magneto-optical recording medium is a rewritable medium having a very high recording density.

However, the recording capacity should further be increased to record a tremendous amount of data and motion pictures for the upcoming multimedia age. For the increase in the recording capacity, a greater amount of recording marks should be formed on the medium. Therefore, marks having a smaller length should be arranged at smaller intervals than the currently employed marks. For higher density recording with this arrangement, a laser beam to be applied to the medium should have a wavelength smaller than 780 nm or 680 nm. In consideration of the practicality, the reduction in the length of the marks is more effective than the reduction in the wavelength of the laser beam.

Various methods have been proposed for data reproduction from marks having a smaller size than the diameter of the laser beam.

Japanese Unexamined Patent Publication No. HEI 1(1989)-143041, for example, proposed a method called "FAD (Front Aperture Detection) method" (first prior art), which is adapted to read a recording mark in a low temperature region within a laser spot while utilizing a high temperature region as a mask region.

Japanese Unexamined Patent Publications No. HEI 3(1991)-93056 and No. HEI 3(1991)-93058 proposed methods called "RAD (Rear Aperture Detection) method" (second prior art), which is adapted to read a recording mark in a high temperature region within a laser spot while utilizing a low temperature region as a mask region.

Japanese Unexamined Patent Publication No. HEI 4(1992)-271039 proposed a method called "RAD double mask method" (third prior art), which is adapted to read a recording mark in an intermediate region between a low temperature region and a high temperature region within a laser spot while utilizing the low temperature region and the high temperature region as mask regions.

Japanese Unexamined Patent Publication No. HEI 5(1993)-12731 proposed a method called "CAD (Center Aperture Detection) method" (fourth prior art).

The prior art methods described above can read a recording mark in a region having a smaller size than the diameter of a spot of a reproduction laser beam, and provide a resolution substantially equivalent to that provided by reproduction with the use of a light spot smaller in diameter than the spot of the reproduction laser beam.

However, the aforesaid prior art methods have the following drawbacks.

The first prior art method, which is adapted for reproduction in the low temperature region, allows for size reduction of the entire system without the need for provision of an initialization magnet, but is not effective for prevention of crosstalk because recording marks in neighboring tracks may be detected to affect the reproduction.

The second prior art method, which is adapted for reproduction in the high temperature region, is effective for prevention of crosstalk, but does not allow for size reduction of the system with the need for provision of an initialization magnet.

The third prior art method is also effective for prevention of crosstalk, and allows for enhancement of reproduction output. However, it is impossible to reduce the size of the system with the need for provision of an initialization magnet as in the second prior art method.

The fourth prior art method requires no initialization magnet, but fails to provide a high reproduction output because there is a larger transition area in which the orientation of magnetization of a reproduction layer is shifted from an in-plane direction to a perpendicular direction.

Since the prior art methods have the drawbacks described above, the inventors of the present invention have proposed, in Japanese Unexamined Patent Publication No. HEI 7(1995)-244877, a magneto-optical recording medium (fifth prior art) which is capable of providing a magnetic super resolution (MSR) and a high reproduction output without the need for provision of an initialization magnet. An explanation will hereinafter be given to the magneto-optical recording medium according to the fifth prior art.

As shown in FIG. 10, the magneto-optical recording medium comprises a reproduction layer 4, an intermediate layer 5 and a recording layer 6 stacked in this order on a substrate (now shown). The reproduction layer 4 is composed of a rare earth-transition metal amorphous alloy such as GdFeCo, and has a direction of easy magnetization extending perpendicularly thereto. The intermediate layer 5 is composed of a rare earth-transition metal amorphous alloy such as GdFeCo, and has a direction of easy magnetization which extends in an in-plane direction at room temperature but is shifted from the in-plane direction to a perpendicular direction when the layer is heated up to a predetermined temperature by application of a reproduction light beam. The recording layer 6 is composed of a rare earth-transition metal amorphous alloy such as TbFeCo, and has a direction of easy magnetization extending perpendicularly thereto. The reproduction layer 4, the intermediate layer 5 and the recording layer 6 have Curie temperatures Tc1, Tc2 and Tc3, respectively, which satisfy relationships of Tc2<Tc1 and Tc2<Tc3. Further, the reproduction layer 4 and the recording layer 6 have coercive forces Hc1 and Hc3, respectively, which satisfy a relationship of Hc3>Hc1 at room temperature.

The reproduction layer 4 serves as a mask for reading a signal or for providing a magnetic super resolution. The intermediate layer 5 has an in-plane magnetization property at room temperature and, when the layer is heated, is exchange-coupled to the recording layer 6, whereby the magnetization direction thereof is copied to the reproduction layer 4. The recording layer 6 is adapted for thermal magnetic recording which is achieved by heating the layer up to a temperature near its Curie temperature with application of a recording magnetic field for inversion of the direction of the magnetization.

For reproduction of data recorded in the recording layer 6, smaller size marks are accurately read by utilizing a temperature gradation generated within a laser spot on the medium.

Erasing, recording and reproducing operations to be performed on the magneto-optical recording medium will be explained with reference to FIGS. 10 to 13. It is herein assumed that an upward bias magnetic field is applied for recording data and a downward bias magnetic field is applied for reproducing and erasing the data. The explanation will be given on the assumption that the reproduction layer 4 and the recording layer 6 are rich in transition metals (TM-rich) and the intermediate layer 5 is rich in rare earth elements (RE-rich).

As shown in FIG. 10, the magneto-optical recording medium is irradiated with an erasing laser beam 18 with a bias magnetic field (erasing magnetic field 16) being applied downward, so that the recording layer 6 is heated at a temperature higher than its Curie temperature thereby to be magnetized downward. The recording medium is cooled to room temperature when it is brought away from the laser beam. At room temperature, the intermediate layer 5 is in an in-plane magnetization layer, so that the reproduction layer 4 and the recording layer 6 are not magnetically coupled to each other.

Therefore, the reproduction layer 4 is uniformly magnetized downward by application of a magnetic field having a relatively low intensity equivalent to that of the erasing bias magnetic field. An arrow A indicates a moving direction of the medium.

As shown in FIG. 11, only a recording site of the recording medium is irradiated with a high intensity laser beam with a bias magnetic field (recording magnetic field 17) being applied upward, whereby only the data recorded site is magnetized upward. The recording medium is cooled to room temperature when it is brought away from the laser beam. At room temperature, the intermediate layer 5 is in the in-plane magnetization layer, so that the reproduction layer 4 and the recording layer 6 are not magnetically coupled to each other. Therefore, the reproduction layer 4 is uniformly magnetized downward by application of a magnetic field having a relatively low intensity equivalent to that of the bias magnetic field.

Next, an explanation will be given to the reproducing operation. In a low temperature region of a laser spot within a region 20 to which a reproducing magnetic field 14 is applied, the exchange-coupling force between the intermediate layer 5 and the recording layer 6 is weak, so that the magnetization of the intermediate layer 5 is oriented in the direction of the reproducing magnetic field and the magnetization of the reproduction layer 4 is oriented upward opposite to the direction of the magnetization of the intermediate layer 5 by an exchange-coupling force (front mask 13a) as shown in FIG. 12. In a high temperature region, on the other hand, the intermediate layer 5 and the recording layer 6 are exchange-coupled to each other, and the intermediate layer 5 and the reproduction layer 4 are exchange-coupled to each other. Therefore, the magnetization direction of the recording layer 6 is copied to the reproduction layer 4, so that data recorded in the recording layer 6 can be read. This reproducing process is referred to as "single mask reproduction".

In the high temperature region, the recording medium is heated at higher than the Curie temperature of the intermediate layer 5, so that the reproduction layer 4 is uniformly magnetized downward in the direction of the bias magnetic field as shown in FIG. 13. Therefore, the reproduction layer 4 serves as a mask (rear mask 13b). This reproducing process is referred to as "double mask reproduction".

When a magneto-optical output is differentially detected, a magneto-optical signal is read neither in the low temperature region nor in the high temperature region, but only in an intermediate temperature region, because the low temperature region and the high temperature region serve as the masks within the laser spot. This allows for super resolution reproduction and provides a high reproduction output without provision of an initialization magnet, so that data can accurately be reproduced from marks having a size smaller than a diffraction limit of the wavelength of the laser beam. In FIGS. 10 to 13, a reference character A denotes a moving direction of the medium, and reference characters 12 and 18 denote an aperture and a beam spot, respectively.

SUMMARY OF THE INVENTION

However, it has been found that, where the use of a land/groove substrate having a smaller track pitch is desired for higher density recording, for example, the prior art methods present the problem of crosstalk from adjacent tracks. This is attributable to the fact that, with a track pitch smaller than the diameter of the beam spot, the heat reaches neighboring tracks, whereby recording marks on the neighboring tracks are also brought into a magnetization copied state.

Where the laser beam has a wavelength of 660 nm and an objective lens has an NA of 0.55, for example, the beam spot has a diameter of about 1 $\mu$m. When a land/groove substrate having a track pitch of 0.6 $\mu$m is employed in this case, about 40% of light of the beam is applied to the neighboring tracks to cause crosstalk even with a magnetic super resolution.

The medium for the magnetic super resolution has a higher circumferential resolution to make it possible to read small marks. In order to reduce the width of the tracks for increasing the density of the recording medium, it is necessary to increase a radial resolution.

To solve the aforesaid problem, the present invention is directed to a magneto-optical recording medium which is highly resistant to crosstalk and permits the use of a land/groove substrate having narrower tracks for improvement in recording density.

In accordance with the present invention, there is provided a magneto-optical recording medium including a recording layer, an intermediate layer and a reproduction layer in which data is transferred from the recording layer to an aperture between two mask regions generated along the scanning direction of the reproduction layer by temperature distribution through beam spot scanning, thereby reading the data out, wherein a mask layer having a direction of easy magnetization extending in an in-plane direction at room temperature is formed on the reproduction layer, the mask layer having magnetic property for controlling expansion in a lateral direction of the aperture between the two mask regions generated in front and behind along the scanning direction under the temperature distribution given by the beam spot.

Further, there is provided according to the present invention a magneto-optical recording medium including at least a recording layer, an intermediate layer and a reproduction layer and reproducing data in a magnetic super resolution mode, wherein a mask region occurring in accordance with temperature distribution given by an optical beam irradiated during reproduction and a mask layer for controlling the expansion of a reproduction aperture defined by the mask region are formed on the reproduction layer.

Still further, there is provided according to the present invention a magneto-optical recording medium comprising:

a recording layer made of TbFeCo which has a direction of easy magnetization extending in a direction perpendicular to the layer and shows a transition metal-rich magnetization;

an intermediate layer made of GdFeCo, GdFeCoSi or GdFe which has a direction of easy magnetization extending in an in-plane direction at room temperature and shows a rare earth element-rich magnetization;

a reproduction layer made of GdFeCo or GdDyFeCo which has a direction of easy magnetization extending in a direction perpendicular to the layer and shows a transition metal-rich magnetization; the layers being stacked in this order, wherein a mask layer made of GdFeCo which is formed on the reproduction layer, has a direction of easy magnetization extending in an in-plane direction at room temperature, shows a rare earth element-rich magnetization, and exhibits a Curie temperature higher than that of said layers.

In accordance with the present invention, there is provided a reproduction method for a magneto-optical recording medium, the magneto-optical recording medium being a magnetic super resolution type magneto-optical recording disk of multilayer structure including at least a recording layer, an intermediate layer, a reproduction layer and a mask layer stacked in this order and having a plurality of recording tracks arranged at a predetermined track pitch in a radius direction, the reproduction method transferring data which is magnetically recorded in the recording layer of each track to the reproduction layer, thereby reproducing the data, wherein a track to be read is scanned with a light beam having a spot diameter larger than the track pitch under a state where a reproduction magnetic field is applied in a direction perpendicular to a surface of the disk such that the data in the track to be read is exchanged-coupled to a first reproduction aperture defined between two mask regions generated on the reproduction layer in front and behind along the track direction by temperature distribution through the light beam irradiation, and the data is passed through a second reproduction aperture generated in the mask layer for controlling expansion of the first reproduction aperture in a disk radius direction, thereby reproducing the data.

Further, there is provided according to the present invention a reproduction apparatus for a magneto-optical recording medium, the magneto-optical recording medium being a magnetic super resolution type magneto-optical recording disk of multilayer structure including at least a recording layer, an intermediate layer, a reproduction layer and a mask layer stacked in this order and having a plurality of recording tracks arranged at a predetermined track pitch in a radius direction, the reproduction apparatus being used for transferring data which is magnetically recorded in the recording layer of each track to the reproduction layer, thereby reproducing the data, wherein the reproduction apparatus comprises;

a mounting means which is connected with a driving mechanism and rotatably mounts the magneto-optical disk;

a magnetic field generating device for applying a reproduction magnetic field in a direction perpendicular to a surface of the mounted disk;

an optical system for irradiating a reproduction light beam having a spot diameter larger than the track pitch onto the mask layer side of the disk; and a signal processing means for detecting reflection of the reproduction light beam from the disk and modulating it to an electrical signal, the reproduction apparatus reproduces data by scanning a track to be read with a light beam having a spot diameter larger than the track pitch under a state where a reproduction magnetic field is applied in a direction perpendicular to a surface of the disk such that the data in the track to be read is exchanged-coupled to a first reproduction aperture defined between two mask regions generated on the reproduction layer in front and behind along the track direction by temperature distribution through the light beam irradiation, and passing the data through a second reproduction aperture generated in the mask layer for controlling expansion of the first reproduction aperture in a disk radius direction.

Still further, there is provided according to the present invention a magneto-optical recording medium comprising four magnetic layers including a mask layer, a reproduction layer, an intermediate layer and a recording layer, wherein the reproduction layer and the recording layer each have a direction of easy magnetization extending in a layer stacking direction at room temperature, the mask layer and the intermediate layer each have a direction of easy magnetization extending in an in-plane direction at room temperature, the mask layer, the reproduction layer, the intermediate layer and the recording layer have Curie temperatures Tc1, Tc2, Tc3 and Tc4, respectively, which satisfy relationships of Tc3<Tc2, Tc3<Tc4 and Tc3<Tc1, and the intermediate layer is made of a rare earth transition metal showing a rare earth element-rich magnetization and the mask layer has a region of magnetization in a perpendicular direction surrounded by regions of magnetization in an in-plane direction at a certain temperature.

These and other objects of the present application will become more readily apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

DETAILED DESCRIPTION OF THE INVENTION

Figure 1:
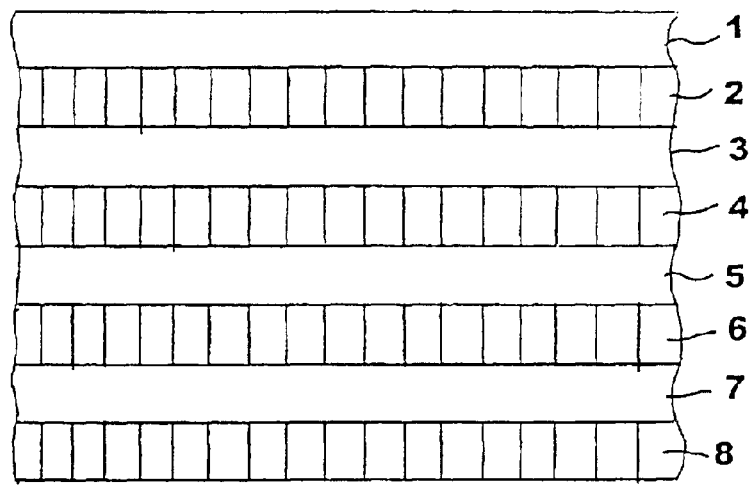
FIG. 1 is a schematic sectional view of a medium according to Example 1.

In accordance with the present invention, a magneto-optical recording medium includes a mask layer, a reproduction layer, an intermediate layer and a recording layer. The reproduction layer and the recording layer each have a direction of easy magnetization extending in a layer stacking direction at room temperature, and the mask layer and the intermediate layer each have a direction of easy magnetization extending in an in-plane direction at room temperature. The mask layer, the reproduction layer, the intermediate layer and the recording layer have Curie temperatures Tc1, Tc2, Tc3 and Tc4, respectively, which satisfy relationships of Tc3<Tc2, Tc3<Tc4 and Tc3<Tc1.

The mask layer has a direction of easy magnetization extending in a direction perpendicular to the layer in a region of transfer temperature. The direction of easy magnetization is shifted to extend in an in-plane direction in a temperature region lower than or higher than the transfer temperature region.

Where the aforesaid relationships are satisfied, it is possible to properly control the size of an aperture as measured along the width of the track (or as measured radially where the medium is of a disk shape) during reproduction. Therefore, the recording medium is more resistant to crosstalk than the fifth prior art recording medium having a three-layer structure, and serves for applications with a smaller track pitch. Accordingly, the inventive recording medium allows for higher density recording than the prior art recording medium.

The four magnetic layers of the inventive magneto-optical recording medium including the mask layer, the reproduction layer, the intermediate layer and the recording layer are preferably each composed of a rare earth-transition metal alloy. Specific examples of the rare earth-transition metal alloy include TbFeCo, GdFeCo, TbDyFeCo, TbGdFeCo, DyGdFeCo and GdFeCoSi. It is particularly preferred that the respective layers are amorphous alloy layers. The proportions of rare earth elements and transition metals in each of these magnetic layers may properly be determined depending on the directions of the easy magnetization of the respective layers, the relationships of the Curie temperatures of the respective layers, the thicknesses of the respective layers, and characteristics desired to be imparted to the magneto-optical recording medium.

The three magnetic layers including the mask layer, the reproduction layer and the intermediate layers are preferably each composed of a magnetic material containing Gd. The recording layer is preferably composed of a magnetic material containing Tb.

Further, the four magnetic layers including the mask layer, the reproduction layer, the intermediate layer and the recording layer may be exchange-coupled to one another in this order. Alternatively, the three magnetic layers including the reproduction layer, the intermediate layer and the recording layer may be exchange-coupled to one another in this order, and the mask layer and the reproduction layer may magnetostatically be coupled to each other. In the latter case, a nonmagnetic layer may be interposed between the mask layer and the reproduction layer for the magnetostatic coupling. The nonmagnetic layer may be composed of a material known in this art, e.g., SiN, $SiO_2$, AlN, C or ZnS—$SiO_2$. Other exemplary materials for the nonmagnetic layer include nonmagnetic metals and semiconductors such as Al, Al alloys (AlTi, AlCr), Pt, Au, Ag, Si and Ge.

An additional magnetic layer having a direction of easy magnetization extending in an in-plane direction at room temperature may be provided so as to be exchange-coupled to the mask layer. The provision of the magnetic layer makes it easier to control the orientation of the magnetization of the mask layer closer to the in-plane direction. The magnetic layer is preferably disposed between the reproduction layer and the mask layer. The magnetic layer may have the same composition as the reproduction layer, and particularly preferably contains Gd.

The mask layer, the reproduction layer, the intermediate layer, the recording layer, the nonmagnetic layer and the magnetic layer to be exchange-coupled to the mask layer can each be formed as having a predetermined thickness by a known method such as a sputtering method.

The inventive magneto-optical recording medium includes a substrate, such as a plastic substrate, a glass substrate or a silicon substrate, which is typically employed in this art. The substrate may be provided adjacent the mask layer or the recording layer. A dielectric layer such as of SiN, $SiO_2$, AlN, $SiAlO_2$ or ZnS—$SiO_2$ may be provided between the substrate and the mask layer. Another dielectric layer such as of SiN, $SiO_2$, AlN, $SiAlO_2$ or ZnS—$SiO_2$ may be provided on a side of the recording layer opposite from the intermediate layer, and a heat release layer such as of Al, AlCr, AlTi, Au, Ag or AgPdCu may be provided on the dielectric layer.

Examples of the present invention will hereinafter be described with reference to the attached drawings.

EXAMPLE 1

FIG. 1 is a schematic sectional view of a magneto-optical recording medium according to Example 1. As shown in FIG. 1, four magnetic layers of the recording medium are exchange-coupled to one another. More specifically, the recording medium includes a polycarbonate substrate 1, and a dielectric layer (SiN layer) 2, a mask layer 3, a reproduction layer 4, an intermediate layer 5, a recording layer 6, a dielectric layer (SiN layer) 7 and a heat release layer (AlTi layer) 8 which are stacked in this order on the substrate 1. The mask layer is a 15-nm thick layer of Gd28Fe48Co24 (numerals provided after the respective elements each denote an atomic percentage, and this definition is hereinafter the same), and the reproduction layer is a 30-nm thick layer of Gd25Fe62Co13. The intermediate layer is a 40-nm thick layer of Gd31Fe69, and the recording layer is a 50-nm thick layer of Tb22Fe60Co18. The mask layer, the reproduction layer, the intermediate layer and the recording layer described above have Curie temperatures of 400° C., 280° C., 220° C. and 270° C., respectively.

The medium having the aforesaid construction was produced in the following manner. Targets of SiN, GdFeCo, GdFe, TbFeCo and AlTi were set in a chamber within a sputtering apparatus. Then, a 1.2-mm thick land-groove substrate having lands and grooves arranged at the same pitch was set in the sputtering apparatus. The chamber in the sputtering apparatus was evacuated to $1\times10^{-5}$ Pa. In turn, argon gas and nitrogen gas were introduced into the chamber so as to be maintained in a partial pressure ratio of 3:2 at a gas pressure of 0.4 Pa. The dielectric layer (SiN layer) 2 was formed as having a thickness of 70 nm on the substrate 1 under the aforesaid conditions by the DC sputtering method.

After the chamber was evacuated again to $1\times10^{-5}$ Pa, argon gas was introduced into the chamber so as to be maintained at 0.8 Pa. Then, the magnetic layers 3 to 6 were respectively formed on the resulting substrate by the DC sputtering method.

Subsequently, the chamber was evacuated again to $1\times10^5$ Pa, and then argon gas and nitrogen gas were introduced into the chamber so as to be maintained in a partial pressure ratio of 3:2 at a gas pressure of 0.4 Pa. Then, the dielectric layer (SiN layer) 7 was formed as having a thickness of 30 nm on the resulting substrate by the DC sputtering method.

After the chamber was evacuated again to $1\times10^{-5}$ Pa, argon gas was introduced into the chamber so as to be maintained at 0.8 Pa, and the heat release layer (AlTi layer) 8 was formed as having a thickness of 15 nm on the resulting substrate by the DC sputtering method.

Thus, the magneto-optical recording medium shown in FIG. 1 was obtained.

EXAMPLE 2

Figure 2:
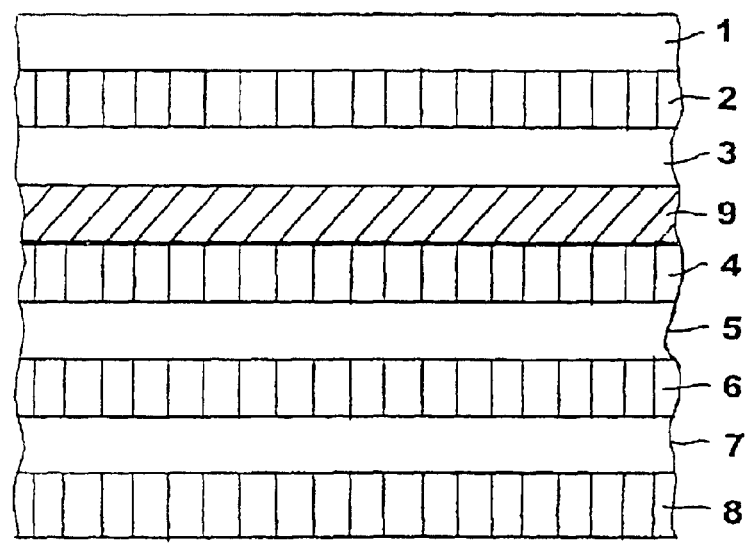
FIG. 2 is a schematic sectional view of a medium according to Example 2.

FIG. 2 is a schematic sectional view of a magneto-optical recording medium according to Example 2. As shown in FIG. 2, three magnetic layers of the recording medium except a mask layer are exchange-coupled to one another, and the mask layer is magnetostatically coupled to a reproduction layer. More specifically, the recording medium includes a polycarbonate substrate 1, and a dielectric layer (SiN layer) 2, a mask layer 3, a nonmagnetic layer (SiN layer) 9, a reproduction layer 4, an intermediate layer 5, a recording layer 6, a dielectric layer (SiN layer) 7 and a heat release layer (AlTi layer) 8 which are stacked in this order on the substrate 1. The mask layer is a 20-nm thick layer of Gd28Fe47Co25, and the reproduction layer is a 30-nm thick layer of Gd12Dy12Fe61Co15. The intermediate layer is a 40-nm thick layer of (Gd30Fe67Co3)92Si8, and the recording layer is a 50-nm thick layer of Tb22Fe60Co18.

For production of the medium having the aforesaid construction, the respective layers except the nonmagnetic layer 9 were formed in the same manner as in Example 1. Formation of the nonmagnetic layer (SiN layer) 9 was achieved in the following manner. After the chamber was evacuated to $1\times10^{-5}$ Pa, argon gas and nitrogen gas were introduced into the chamber so as to be maintained in a partial pressure ratio of 3:2 at a gas pressure of 0.4 Pa. Then, the nonmagnetic layer was formed as having a thickness of 3 nm by the DC sputtering method.

EXAMPLE 3

Figure 3:
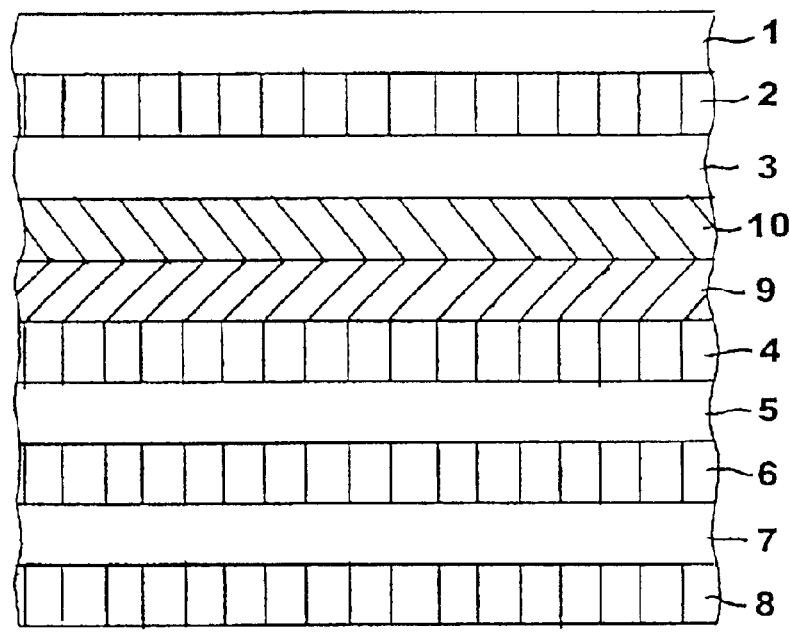
FIG. 3 is a schematic sectional view of a medium according to Example 3.

FIG. 3 is a schematic sectional view of a magneto-optical recording medium according to Example 3. As shown in FIG. 3, the recording medium has substantially the same construction as shown in FIG. 2, but additionally includes a magnetic layer 10 which is provided between the mask layer 3 and the nonmagnetic layer 9 to be exchange-coupled to the mask layer 3. More specifically, the recording medium includes a polycarbonate substrate 1, and a dielectric layer (SiN layer) 2, a mask layer 3, a magnetic layer 10, a nonmagnetic layer (Si layer) 9, a reproduction layer 4, an intermediate layer 5, a recording layer 6, a dielectric layer (SiN layer) 7 and a heat release layer (AlTi layer) 8 which are stacked in this order on the substrate 1. The mask layer is a 20-nm thick layer of Gd30Fe45Co25, and the magnetic layer is a 10-nm thick layer of Gd15Fe85. The reproduction layer is a 30-nm thick layer of Gd24Fe67Co15. The intermediate layer is a 40-nm thick layer of (Gd30Fe67Co3)92Si8, and the recording layer is a 50-nm thick layer of Tb22Fe60Co18.

For production of the medium having the aforesaid construction, formation of the respective layers except the magnetic layer 10 were achieved in substantially the same manner as in Examples 1 and 2, except that the nonmagnetic layer had a thickness of 5 nm. Formation of the magnetic layer 10 was achieved in substantially the same manner as the formation of the other magnetic layers, except that GdFe was employed as a target.

Figure 4:
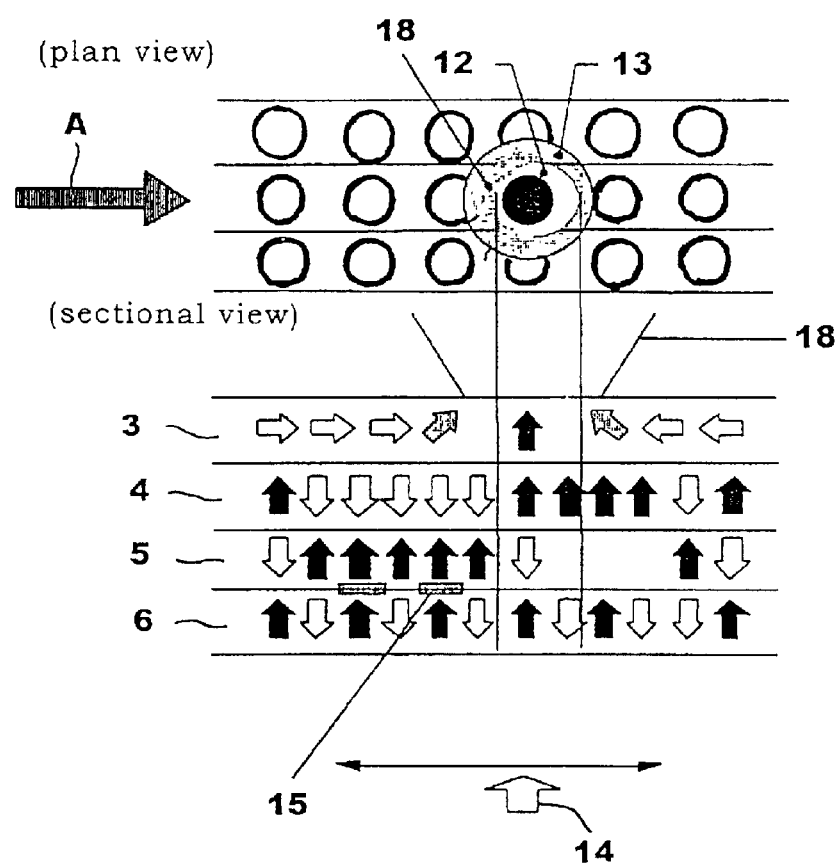
FIG. 4 is schematic diagrams illustrating the medium of Example 1 in a reproduction state.
Figure 5:
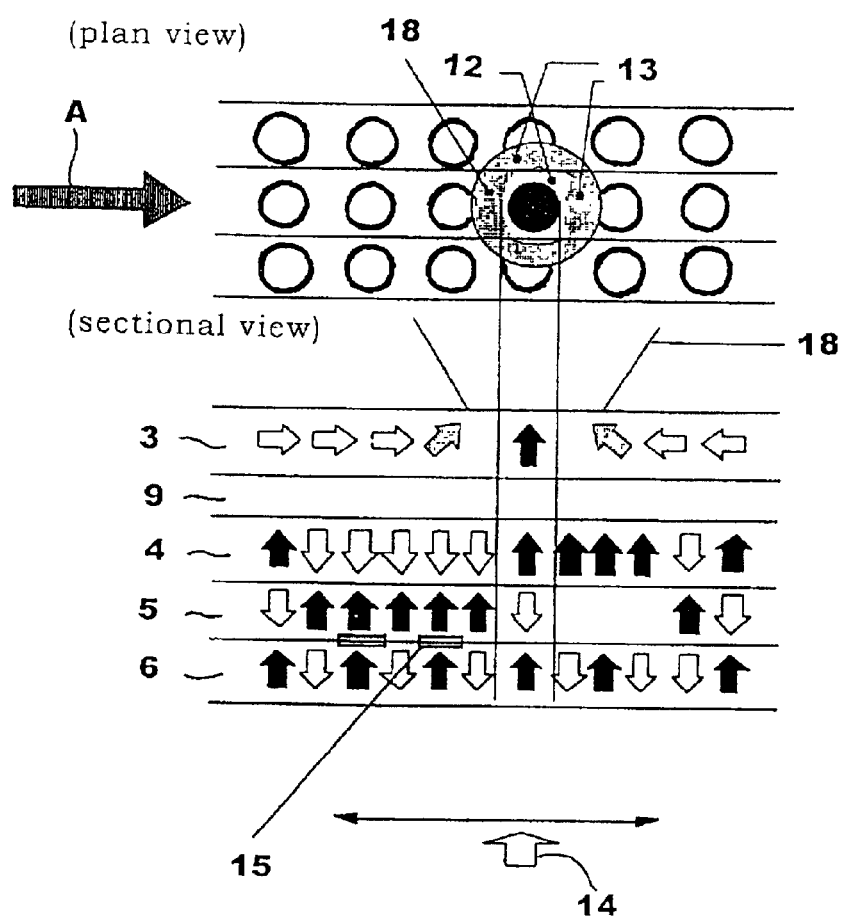
FIG. 5 is schematic diagrams illustrating the medium of Example 2 in a reproduction state.
Figure 6:
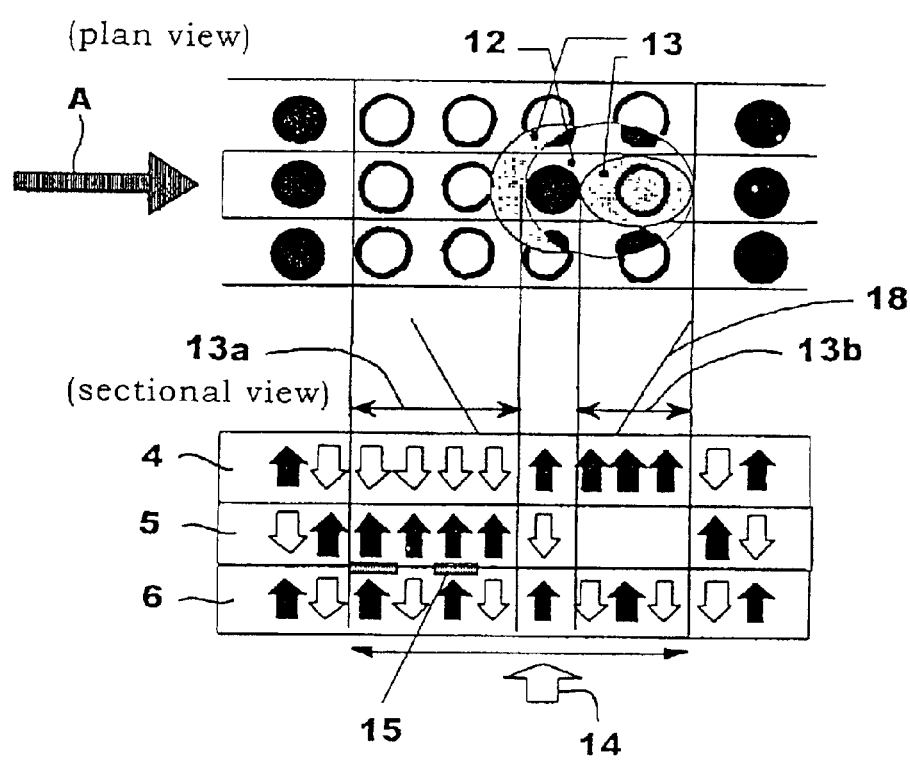
FIG. 6 is schematic diagrams illustrating a medium according to the fifth prior art in a reproduction state.

Evaluation of Magneto-Optical Recording Media of Examples 1 to 3 in Erasing, Recording and Reproducing Operations Erasing, recording and reproducing operations of the magneto-optical recording media produced in the aforesaid manner are performed basically in the same manner as in the fifth prior art method. The magneto-optical recording media of Examples 1 and 2 in a reproduction state are schematically shown in FIGS. 4 and 5, respectively. The fifth prior art recording medium in a reproduction state is schematically shown in FIG. 6. In FIGS. 4 to 6, plan views are shown on the upper side, and sectional views are shown on the lower side. A reference character 12 denotes an aperture, and reference characters 13, 13a and 13b denote a mask, a front mask and a rear mask, respectively. Reference characters 15 and A denote an interface magnetic wall and a medium moving direction, respectively. A reference character 14 denotes a reproduction magnetic field, which is herein applied in a direction which allows for recording. In FIGS. 4 to 6, the substrate, the dielectric layer and the heat release layer are not illustrated.

As can be seen from FIGS. 4 and 5, the mask layer 3 of the magneto-optical recording medium of the present invention has a region which is obliquely magnetized with the aperture being radially narrowed. As compared with the fifth prior art recording medium having no such region as shown in FIG. 6, the inventive recording medium suppresses the crosstalk due to the magnetization state of this region, and is particularly resistant to radial crosstalk. This effect has been confirmed for the exchange-coupling structure (FIG. 1) as well as for the magnetostatic coupling structure (FIGS. 2 and 3).

It has been confirmed that the mask layer has a greater Kerr rotation angle to provide an enhancement effect because the mask layer is Co-richer than the reproduction layer.

In the fifth prior art, the aperture in the reproduction laser beam is relatively small when the laser beam has a lower intensity. Therefore, recording marks on neighboring tracks are not detected because they are not in a magnetization copied state. When the reproduction laser beam has a higher intensity, however, the recording marks on the neighboring tracks are in the magnetization copied state as shown in FIG. 6 thereby to be detected as crosstalk.

Further, it has been confirmed that the magnetostatic coupling structure provides the aforesaid effect even if the dielectric layer is not composed of SiN but composed of $SiO_2$, AlN, C or $ZnS-SiO_2$, or a nonmagnetic metal or semiconductor such as Al, an Al alloy (AlTi, AlCr), Pt, Au, Si or Ge. It has also been confirmed that the aforesaid effect can be provided even if the magnetic layer disposed between the mask layer and the nonmagnetic layer and the intermediate layer have the same composition. Further, it has been confirmed that the use of the magnetic layer makes it easier to control the oblique magnetization of the aforesaid region to provide a wider margin for the production of the medium.

Figure 7:
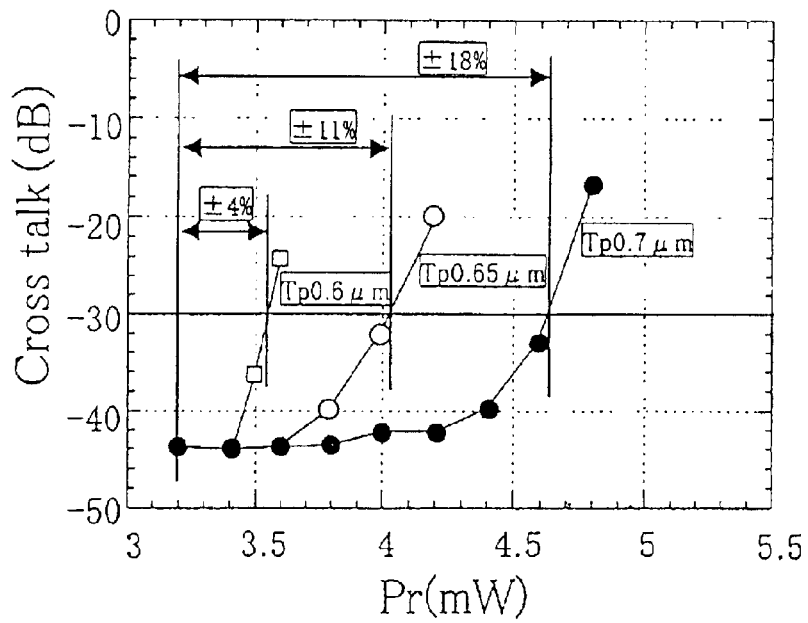
FIG. 7 is a graph illustrating a track pitch dependence of crosstalk occurring in the medium of the fifth prior art.
Figure 8:
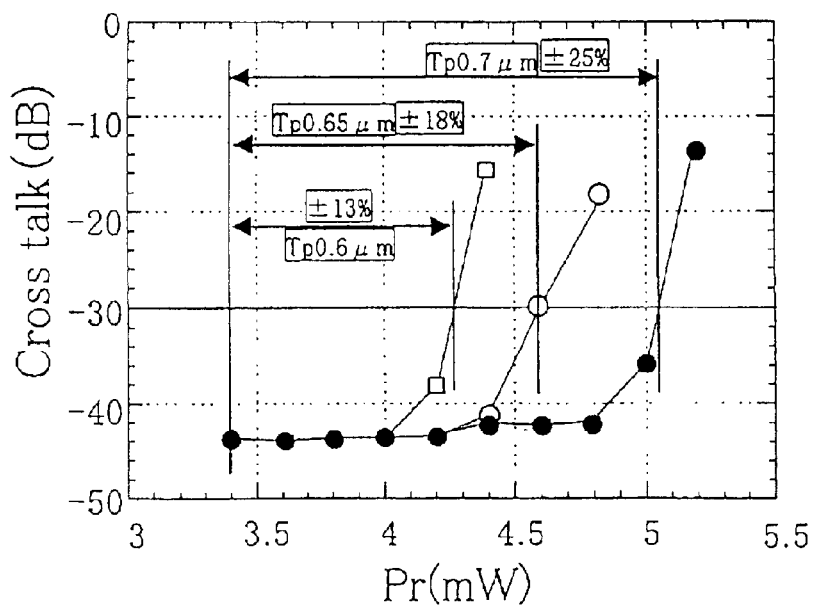
FIG. 8 is a graph illustrating a track pitch dependence of crosstalk occurring in the medium of the present invention.

Measurement of crosstalk was performed on the aforesaid media. The results are shown in FIGS. 7 and 8 and in Table 1. In a measuring instrument employed for the reproducing operation, a semiconductor laser beam had a wavelength of 660 nm, and an objective lens had an NA of 0.55. A beam spot was of a generally round shape having a diameter of 1.0 μm, and the medium was moved at a circumferential speed of 8 m/s. The measurement of the crosstalk was performed in the following manner. No data was recorded on a track of interest, while long mark data was recorded on tracks adjacent to that track. For the measurement of the crosstalk, a difference between signals (carrier) leaking from the adjacent tracks into the track of interest and signals from the adjacent tracks was determined. The signals were measured by a spectral analyzer.

In the medium of the fifth prior art, the mask layer was not formed and other layers than the mask layer were fabricated by using the same film materials, compositions, and thicknesses as employed in Example 1.

The measurement results for the fifth prior art medium are shown in FIG. 7, in which a reproducing power is plotted as abscissa. As can be seen, heat produced by the beam affected the adjacent tracks to augment the crosstalk as the reproducing power was increased. It is herein assumed that the threshold of the crosstalk is −30 dB. With a track pitch Tp of 0.7 μm, the range of the reproducing power allowable for the reproduction is from 3.2 mW at which the reproduction was started to 4.7 mW with a margin of ±18%. With a track pitch of 0.6 μm, however, the margin was very small (±4%).

The results of the measurement performed in the same manner on the medium of Example 1 of the present invention are shown in FIG. 8. Even with a track pitch of 0.6 μm, a sufficient margin (±13%) was provided, which was greater than in the prior art. The results of the measurement performed in the same manner on the media of Examples 1 to 3 with different track pitches are shown in Table 1.

TABLE 1

|  | Tp (μm) | | | |
| --- | --- | --- | --- | --- |
|  | 0.7 | 0.65 | 0.6 | 0.55 |
| Example 1 | ±25% | ±18% | ±13% | ±6% |
| Example 2 | ±26% | ±18% | ±14% | ±8% |
| Example 3 | ±28% | ±21% | ±16% | ±11% |
| Fifth prior art | ±18% | ±11% | ±4% | — |

The media according to the present invention provided better results than the medium of the prior art under any conditions.

EXAMPLE 4

Figure 9:
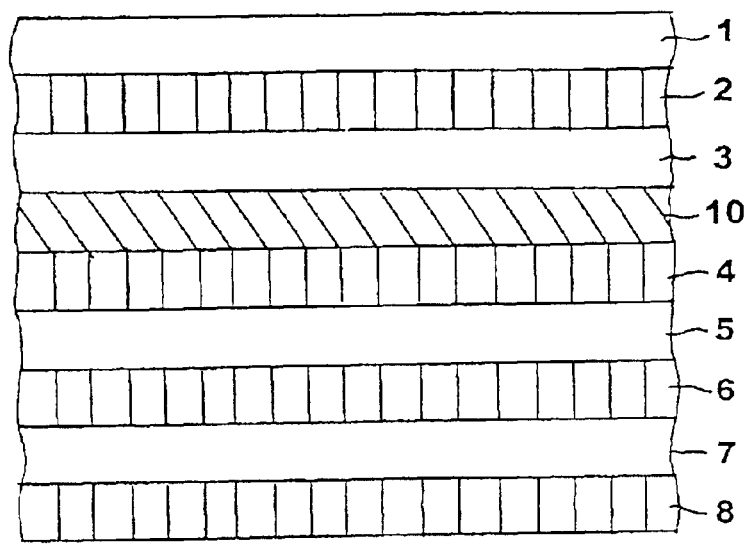
FIG. 9 is a schematic sectional view of a medium according to Example 4.
Figure 10:
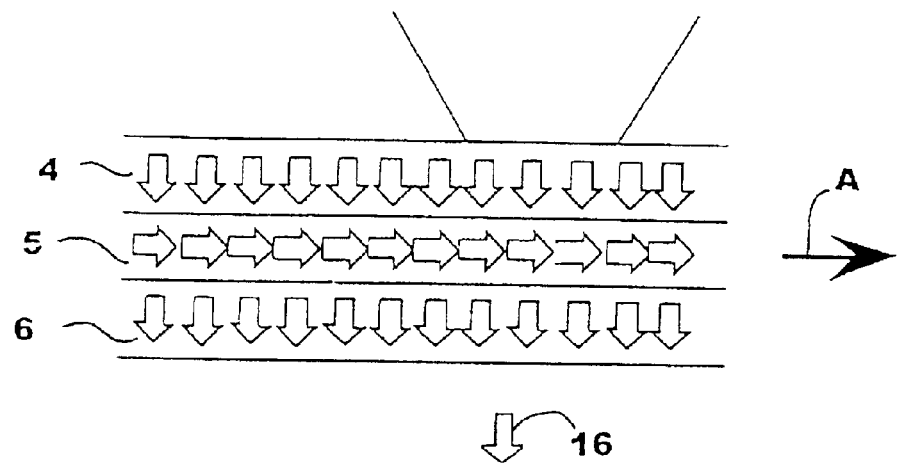
FIG. 10 is a schematic diagram for explaining the principle of an erasing operation to be performed on the medium of the fifth prior art.
Figure 11:
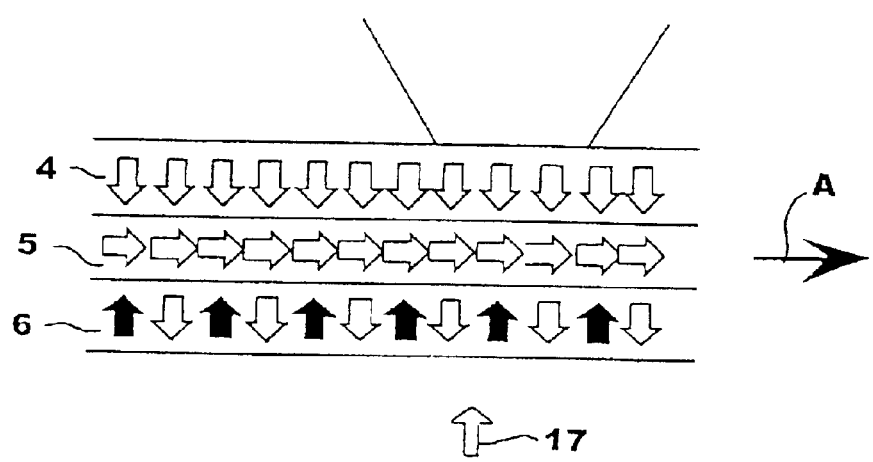
FIG. 11 is a schematic diagram for explaining the principle of a recording operation to be performed on the medium of the fifth prior art.
Figure 12:
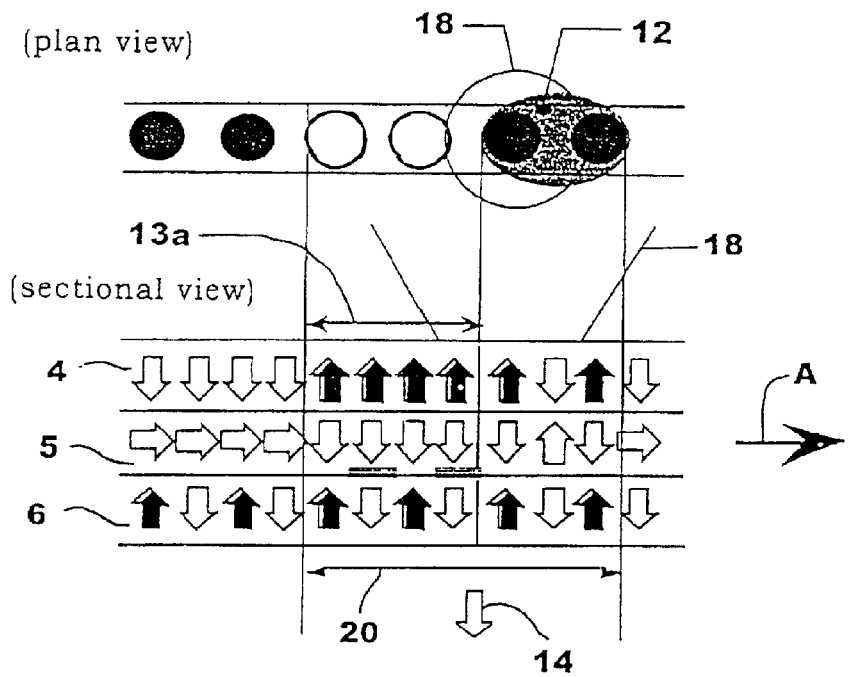
FIG. 12 is a schematic diagram for explaining the principle of a reproducing operation to be performed on the medium of the fifth prior art.
Figure 13:
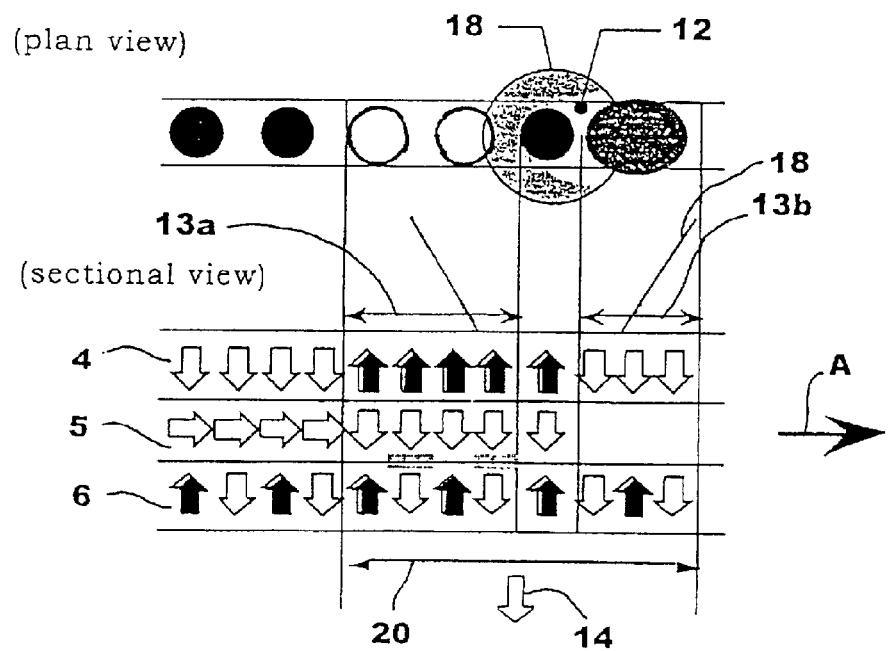
FIG. 13 is a schematic diagram for explaining the principle of a reproducing operation to be performed on the medium of the fifth prior art.

FIG. 9 is a schematic sectional view of a magneto-optical recording medium according to Example 4. As shown in FIG. 9, the recording medium has substantially the same construction as shown in FIG. 1, but additionally includes a magnetic layer 10 which is provided between the mask layer 3 and the reproduction layer 4 to be exchange-coupled to the mask layer 3. More specifically, the recording medium includes a polycarbonate substrate 1, and a dielectric layer (SiN layer) 2, a mask layer 3, a magnetic layer 10, a reproduction layer 4, an intermediate layer 5, a recording layer 6, a dielectric layer (SiN layer) 7 and a heat release layer (AlTi layer) 8 which are stacked in this order on the substrate 1. The mask layer is a 20-nm thick layer of Gd30Fe45Co25, and the magnetic layer is a 10-nm thick layer of Gd15Fe85. The reproduction layer is a 30-nm thick layer of Gd24Fe61Co15. The intermediate layer is a 40-nm thick layer of (Gd30Fe67Co3)92Si8, and the recording layer is a 50-nm thick layer of Tb22Fe60Co18.

For production of the recording medium having the aforesaid construction, formation of the respective layers except the magnetic layer 10 was achieved in the same manner as in Example 1. Formation of the magnetic layer 10 was achieved in the same manner as in Example 3.

The crosstalk characteristic of the medium thus obtained was determined. As a result, the medium had substantially the same crosstalk characteristic as in Example 3. The magnetic layer 10 may be formed of other materials than GdFe, e.g., a ferromagnetic material such as Gd, Fe, Co or Ni, or a magnetic material for magneto-optical use such as TbFe, DyFe, TbFeCo, DyFeCo or GdFeCo. Such materials can also exhibit the same effect as described above.

EXAMPLE 5

In order to define an optimum composition range of Gd in the mask layer, the following tests were carried out. Magneto-optical recording media each having the same film structure as employed in Example 1 were fabricated, but the sputtering for forming the mask layer was carried out by using various targets such that the Gd composition in the mask layer was varied.

The media each had a track pitch of 0.65 μm and an amount of Co in the mask layer was fixed to 23.5 atomic % (hereinafter merely referred to as %). A laser spot diameter was 1 μm.

Figure 15:
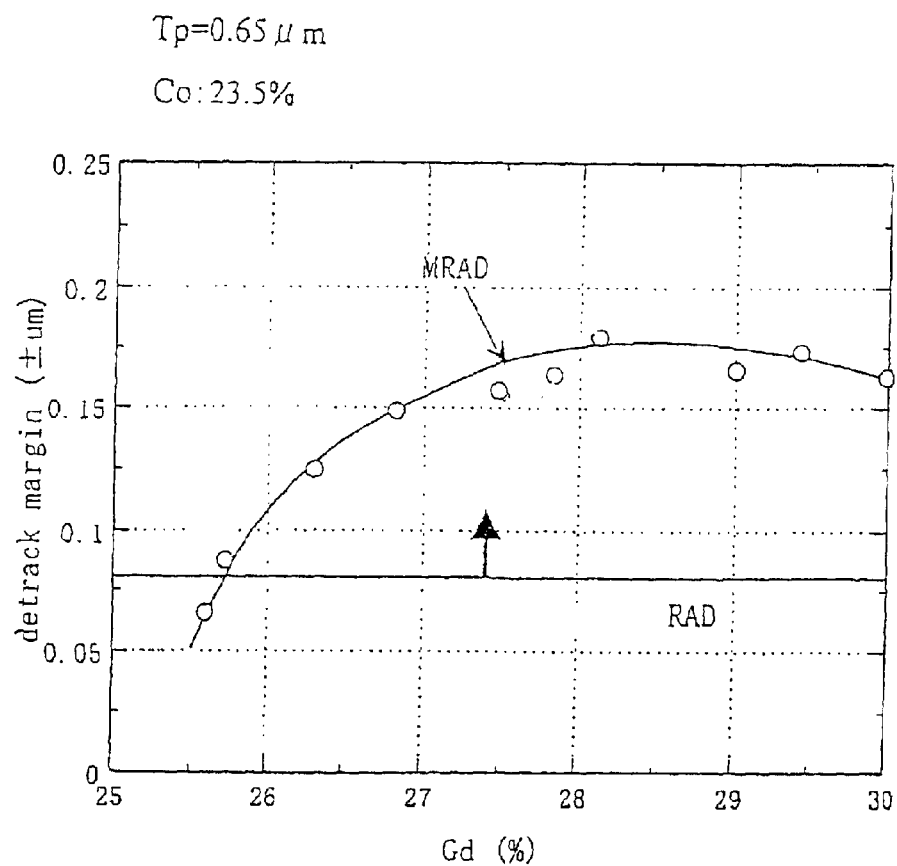
FIG. 15 is a graph illustrating a dependence of the detruck margin upon a Gd concentration in a mask layer.
Figure 16:
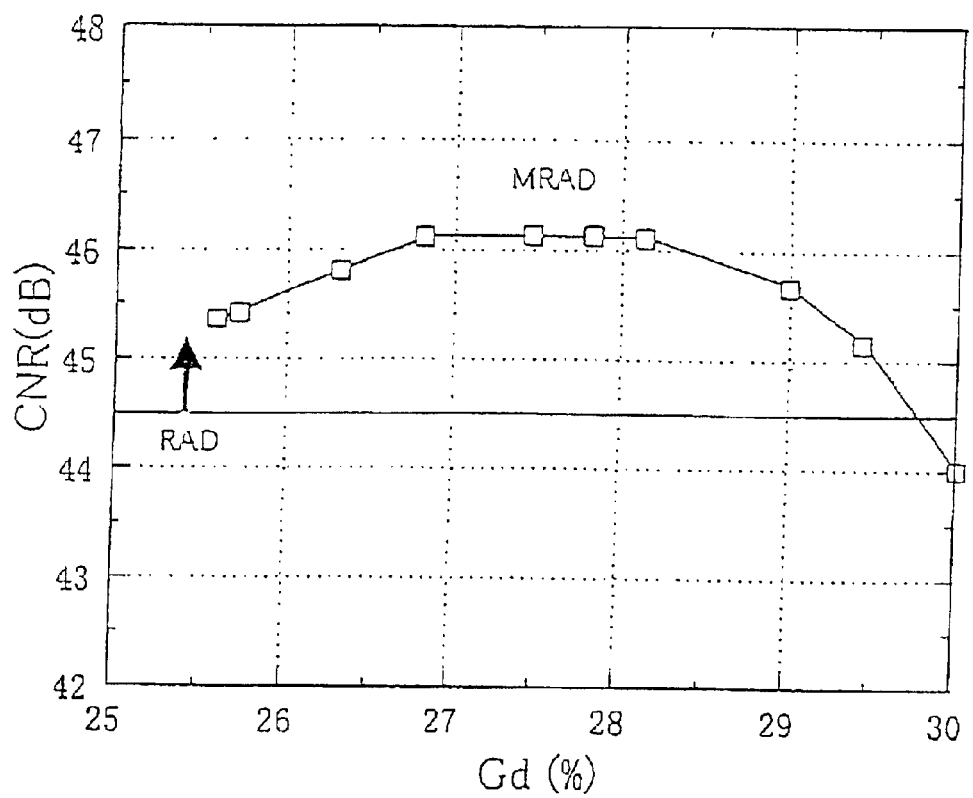
FIG. 16 is a graph illustrating a dependence of CNR upon the Gd concentration in the mask layer.

FIG. 15 shows a dependence of a detruck margin upon the Gd concentration in the mask layer. FIG. 16 shows a dependence of CNR (carrier/noise ratio) upon the Gd concentration in the mask layer.

Figure 14:
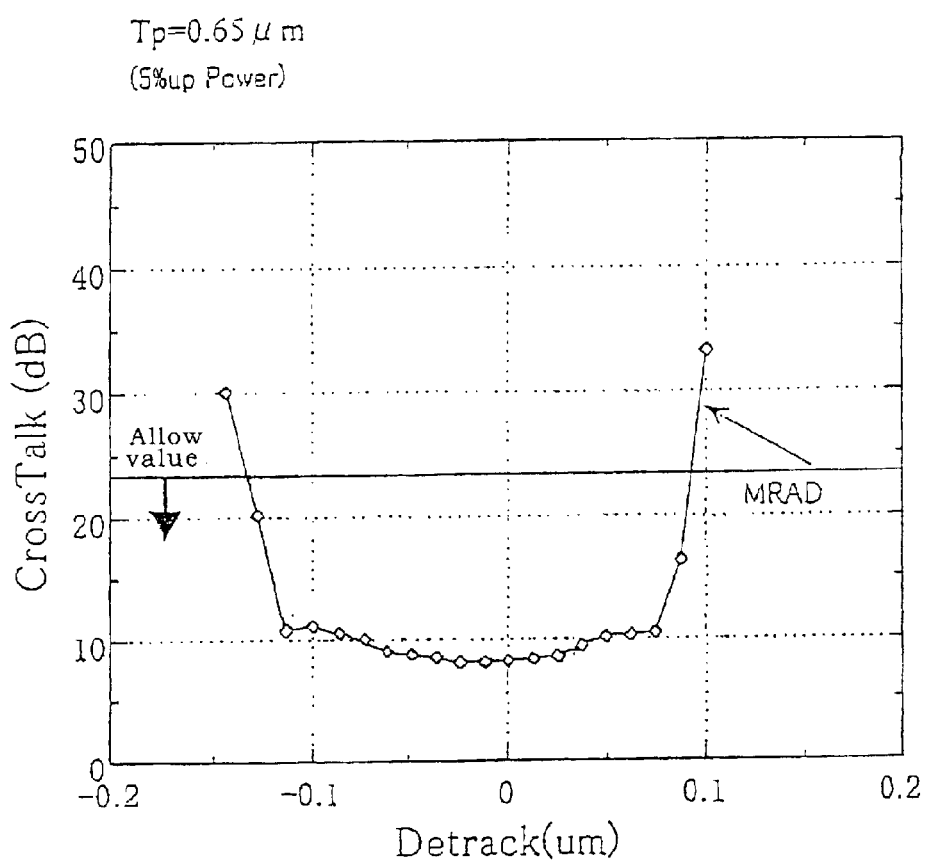
FIG. 14 is a graph explaining a detruck margin.

FIG. 14 is a graph for explaining the above-mentioned detruck margin, showing a detruck dependence of crosstalk occurring in the magneto-optical recording medium according to the present invention. The detruck amount (pm) was plotted on an x-axis and the crosstalk amount (dB) was plotted on a y-axis.

The detruck signifies a positional deviation of the laser spot from a center of a track. No mark was recorded in a center track (a track to be measured) and serial signals of 8T mark and 8T space (mark length of 1.2 $\mu$m) were recorded in tracks adjacent to the track of interest. The crosstalk was measured from the adjacent tracks when the laser spot is irradiated to the center track. Accordingly, if the laser spot is shifted in a direction of a track width, the crosstalk amount increases gradually and then rises sharply when it exceeds a certain limit. In the center track, the detruck amount was 0 $\mu$m.

Regarding CNR, serial signals of 2T mark and 2T space (mark length of 0.3 $\mu$m) were recorded in the center track (to be measured) while no mark was recorded in tracks adjacent to the center track, and then the laser spot was irradiated to the center track for the measurement of CNR.

In FIG. 15, an x-axis indicates the Gd amount in the mask layer, while a y-axis indicates the detruck margin (±$\mu$m). The detruck margin is expressed as an average value between + and − values. A transverse line RAD lying at the detruck margin of ±0.08 $\mu$m is derived from the aforesaid fifth prior art medium in which the mask layer was not formed. On the other hand, a curve MRAD is derived from the media of Example 5 in which the Gd amount in the mask layer was varied, which indicates that the detruck margin increases as the Gd amount is raised to 25.7% or more. Thus, the effect of the mask layer is exhibited.

In FIG. 16, a transverse line RAD lying at CNR of 44.5 dB indicates the characteristic of the fifth prior art medium, while a curve MRAD shows that obtained from the media according to Example 5.

From the measurement results of the detruck margin and CNR, it is found that the optimum composition range of Gd in the mask layer is 25.7% or more to 29.7% or less.

EXAMPLE 6

Media were formed such that the Gd amount in the mask layer was fixed to 27.5% and the Co amount in the mask layer was varied. Then, the optimum composition range of Co in the mask layer was measured.

Figure 17:
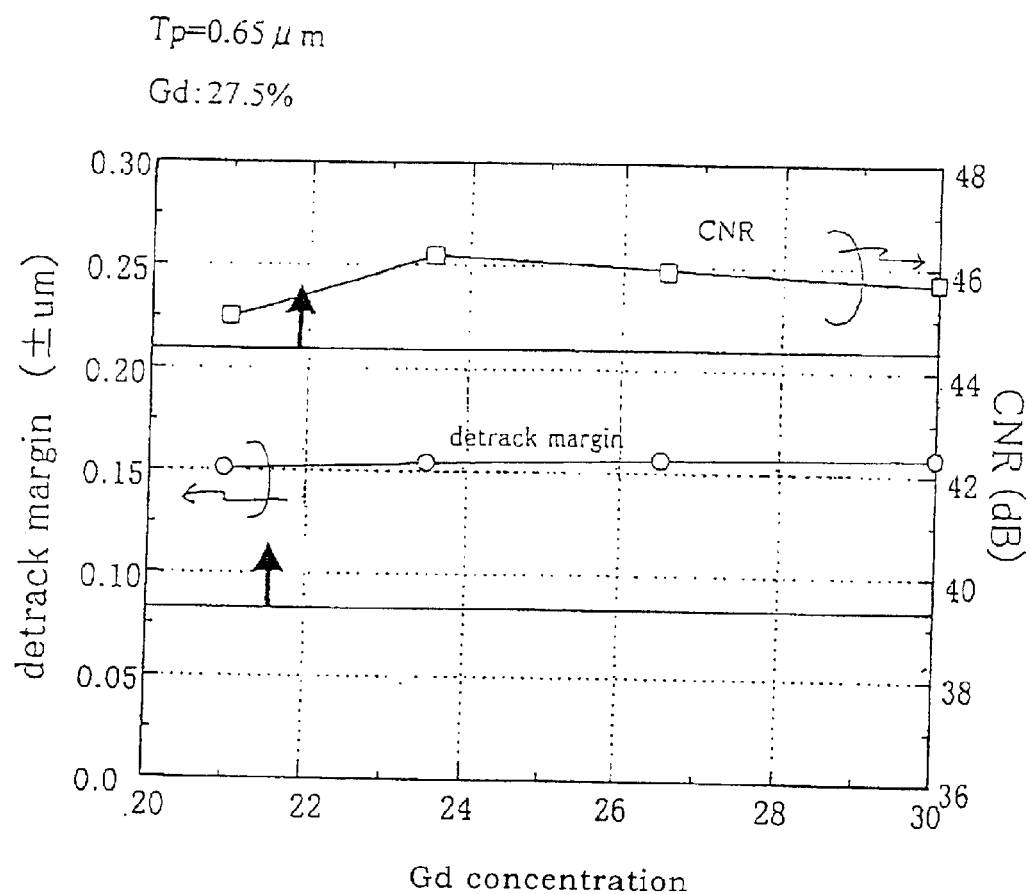
FIG. 17 is a graph illustrating a dependence of the CNR and the detruck margin upon the Gd concentration in the mask layer.

In FIG. 17, an x-axis indicates the Co amount (%) and a y-axis indicates the detruck margin (±$\mu$m) and CNR (dB).

A transverse line RAD lying at the detruck margin of ±0.08 $\mu$m indicates the characteristic of the fifth prior art medium, while a curve MRAD shows that obtained from the media according to Example 6. As seen in the figure, the media according to Example 6 have the margin twice as large as that of the prior art medium.

Further, regarding CNR, a transverse line RAD lying at CNR of 44.5 dB shows the characteristic of the fifth prior art medium, while a curve MRAD shows that obtained from the media according to Example 6. CNR is deteriorated when the Co amount is reduced to about 20%.

From these characteristics, it is found that the optimum composition range of Co is 20% or more to 30% or less.

EXAMPLE 7

Research for the optimum thickness of the mask layer was carried out upon media having the mask layer of various thicknesses. Other layers than the mask layer were formed in the same manner as in Example 1. Accordingly, the thickness of the reproduction layer was fixed to 30 nm.

Figure 18:
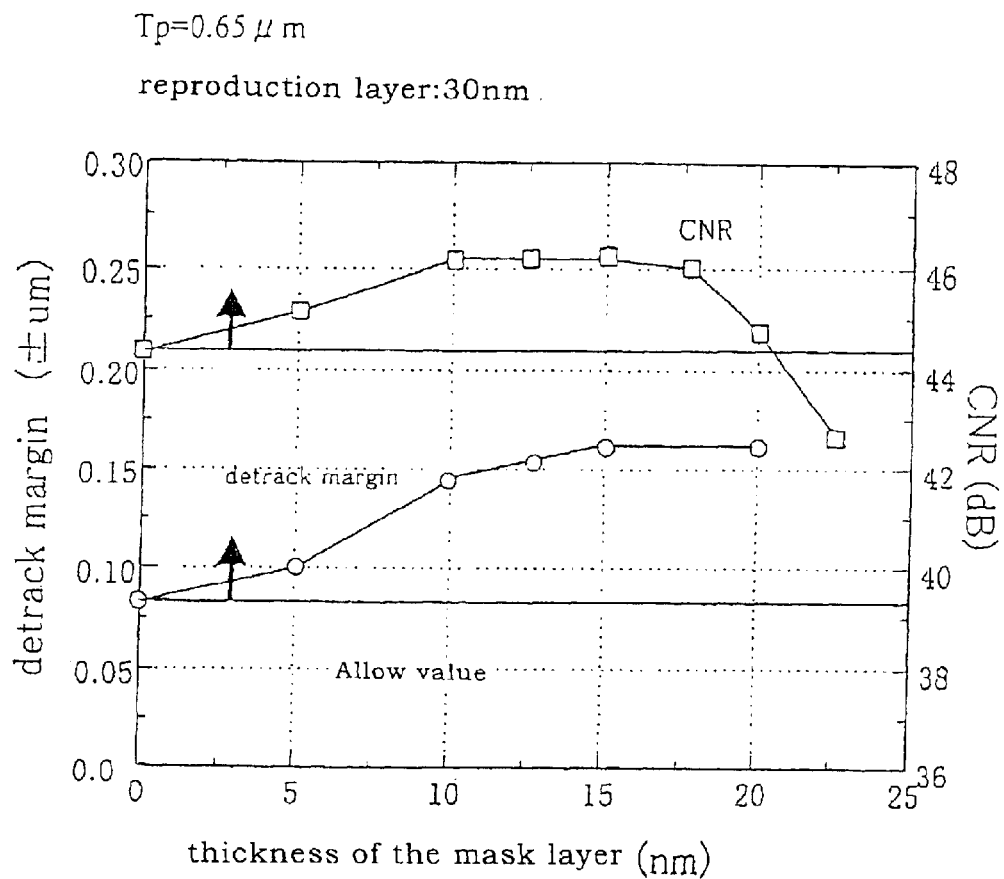
FIG. 18 is a graph illustrating a dependence of the CNR and the detruck margin upon a thickness of the mask layer.

In FIG. 18, the thickness of the mask layer (nm) is plotted on an x-axis, while the detruck margin (±$\mu$m) is plotted on a y-axis.

According to FIG. 18, horizontal lines RAD are derived from the fifth prior art medium, while curves MRAD show the characteristics of the media according to Example 7.

Both of the detruck margin and CNR characteristic are improved as the thickness of the mask layer increases, but the CNR characteristic is deteriorated when the thickness becomes 21 nm or more.

From the above results, it is found that the optimum thickness of the mask layer is 1 nm or more to 21 nm or less, or 3–67% of the thickness of the reproduction layer.

Figure 19:
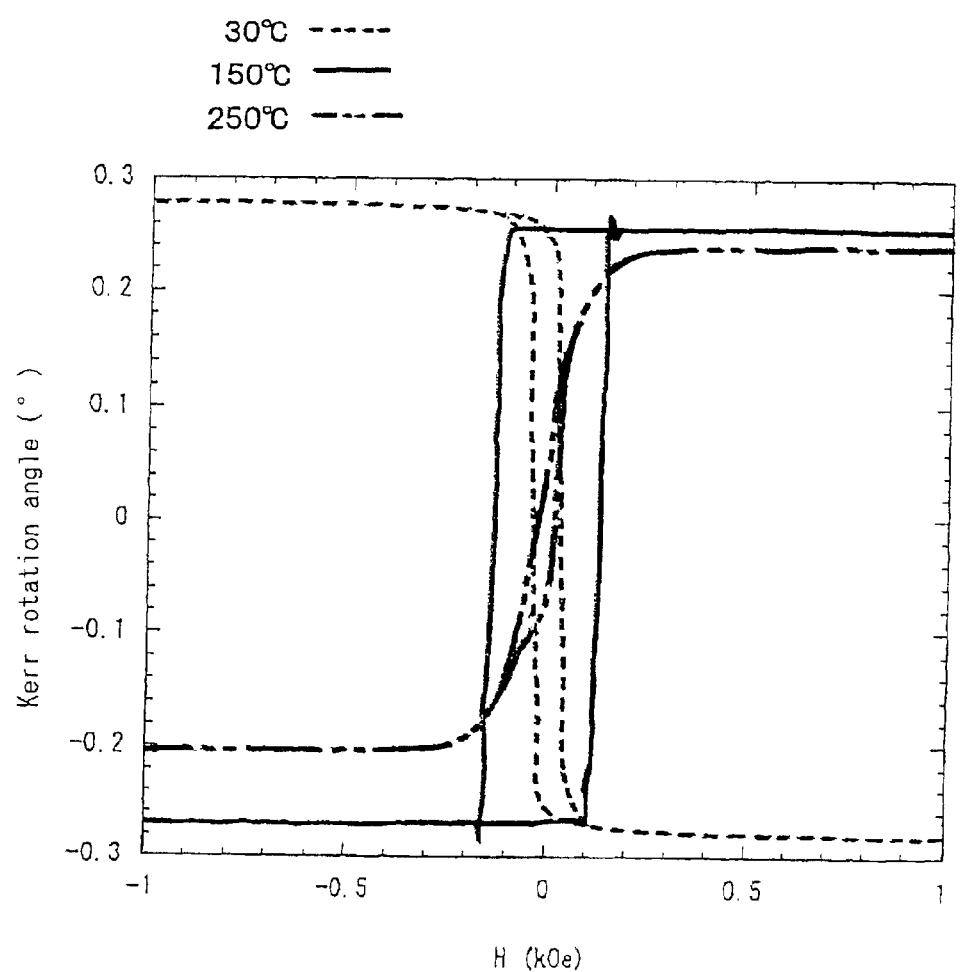
FIG. 19 is a graph illustrating magnetic property when the mask layer is a single layer.

FIG. 19 shows the magnetic property of the medium having a single-layered mask layer, in which Kerr rotation angle (°) is plotted on a y-axis and applied magnetic field H (kOe) is plotted on an x-axis.

In FIG. 19, a dotted line, a solid line and an alternate long and two short dashes line show the characteristics at 30° C., 150° C. and 250° C., respectively.

FIG. 19 indicates that the mask layer has a direction of easy magnetization extending in an in-plane direction at low and high temperatures (30° C. and 250° C.), whereas the direction of easy magnetization is shifted to extend in a perpendicular direction at 150° C., which is a temperature around a region of transfer temperature.

Regarding other layers than the mask layer in the magnetic super resolution medium according to the present invention, the following materials may be used.

The reproduction layer may be a film of GdFeCo or GdDyFeCo which shows the transition metal-rich magnetization and has a direction of easy magnetization extending in a perpendicular direction. The intermediate layer may be a film of GdFe, GdFeCo or GdFeCo (Si) which shows the rare earth element-rich magnetization and has a direction of easy magnetization extending in an in-plane direction at room temperature (10–35° C.). The recording layer may be a film of TbFeCo which shows the transition metal-rich magnetization and has a direction of easy magnetization extending in a perpendicular direction.

The reproduction layer, the intermediate layer and the recording layer have saturated magnetizations of 8–100 emu/cc, 140–250 emu/cc and 50–150 emu/cc, respectively, at room temperature.

Further, the reproduction layer, the intermediate layer and the recording layer have Curie temperatures of 240–350° C., 160–270° C. and 240–350° C., respectively.

Figure 20:
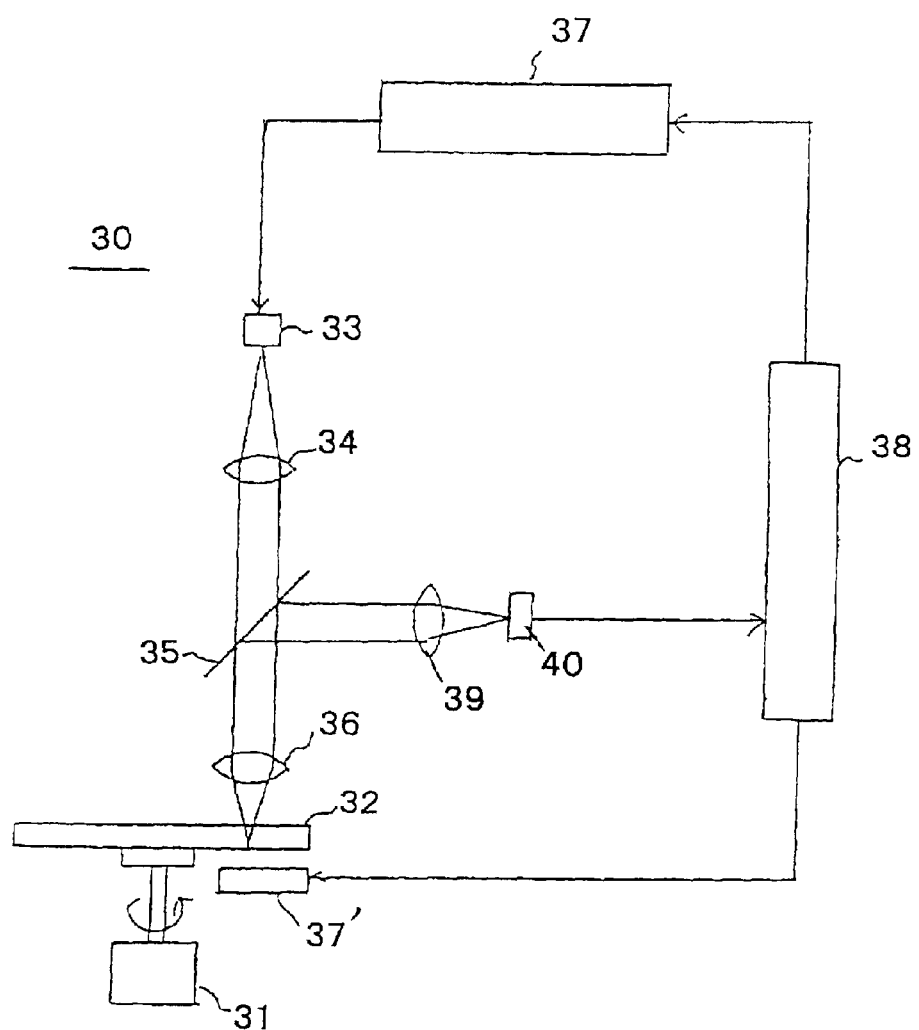
FIG. 20 is a diagram for explaining a structure of an apparatus for data erasing, recording and reproducing from and in the magneto-optical recording medium according to the present invention.

FIG. 20 shows an example of an apparatus for recording, reproducing and erasing data in and out of the recording medium according to the present invention.

FIG. 20 illustrates a magneto-optical recording/reproducing apparatus 30, in which a recording medium 32 according to the above Example is rotated at a constant rotation speed by a spindle motor 31. Onto the medium 32, a laser beam is irradiated from a laser diode 33. The laser beam is converted to a parallel beam by a collimeter lens 34, passes through a half mirror 35, collected by an objective lens 36 and then controlled to be focused on the recording layer. The laser diode 33 is adjusted by a pulse modulating means in a laser driving means 37 such that outputs of high and low levels are obtained. By this means, the laser beam is modulated into pulses in accordance with data to be recorded. Then, a bias magnetic field applying means 37' applies an upward direct current magnetic field of a predetermined level to a region of the recording medium including the beam spot, thereby recording the data. The data can be erased by applying a downward magnetic field and irradiating a laser of a predetermined output. A controller 38 controls the magnetic field application and the laser output.

For the data reproduction, the laser diode 33 is driven by direct current from the laser driving means 37 in accordance with the instruction from the controller 38, thereby irradiating the laser beam, and a reproduction magnetic field having the same direction as that for the recording is applied.

By the irradiation of the laser beam, a mask region 13 and an aperture 12 are generated by temperature distribution as explained above with reference to FIG. 4. A path of light reflected from these regions is biased by the half mirror 35, and then collected by a lens 39 to enter a photodetector 40. A signal from the photodetector 40 is processed by the controller 38, thereby reproducing the recorded data with favorable CNR.

In the foregoing description, explanation is given to the data recording/erasing/reproducing of light modulation mode. However, the present invention is not limited thereto. For example, it may be possible to keep the laser output constant and perform the pulse modulation of the magnetic field by a pulse modulating means built in the bias magnetic field applying means.

While the laser is incident on the substrate 1 in the above examples, the present invention is not limited thereto and the substrate 1 may be formed on the heat release layer 8 so that the laser beam enters the mask layer side.

In accordance with the present invention, the size of an aperture as measured along the width of a track can properly be controlled during reproduction. Therefore, the inventive magneto-optical recording medium is more resistant to crosstalk than the recording medium of the fifth prior art having a three-layer structure, and serves for applications with a smaller track pitch. Accordingly, the inventive recording medium allows for higher density recording than the prior art recording medium.

What is claimed is:

1. A magneto-optical recording medium comprising:
   a recording layer made of TbFeCo which has a direction of easy magnetization extending in a direction perpendicular to the recording layer and shows a transition metal-rich magnetization;
   an intermediate layer stacked on the recording layer and made of GdFeCo, GdFeCoSi or GdFe which has a direction of easy magnetization extending in an in-plane direction at room temperature and shows a rare earth element-rich magnetization;
   a reproduction layer stacked on the intermediate layer and made of GdFeCo or GdDyFeCo which has a direction of easy magnetization extending in a direction perpendicular to the reproduction layer and shows a transition metal-rich magnetization; and
   a mask layer made of GdFeCo which is formed on the reproduction layer, has a direction of easy magnetization extending in an in-plane direction at room temperature, shows a rare earth element-rich magnetization, and exhibits a Curie temperature higher than that of the recording, intermediate and reproduction layers.

2. A magneto-optical recording medium as set forth in claim 1, wherein GdFeCo consisting the mask layer contains Gd in the range of 26 to 30 atomic % and has a compensation temperature between the room temperature and the Curie temperature.

3. A magneto-optical recording medium comprising:
   a mask layer;
   a reproduction layer;
   an intermediate layer; and
   a recording layer,
   wherein the reproduction layer and the recording layer each have a direction of easy magnetization extending in a layer stacking direction at room temperature, the mask layer and the intermediate layer each have a direction of easy magnetization extending in an in-plane direction at room temperature, the mask layer, the reproduction layer, the intermediate layer and the recording layer have Curie temperatures Tc1, Tc2, Tc3 and Tc4, respectively, which satisfy relationships of Tc1>Tc2, Tc1>Tc3, Tc1>Tc4, Tc3<Tc2, and Tc3<Tc4, and the intermediate layer is made of a rare earth transition metal showing a rare earth element-rich magnetization and the mask layer has a region of magnetization in a perpendicular direction surrounded by regions of magnetization in an in-plane direction at a certain temperature.

4. A magneto-optical recording medium as set forth in claim 3, wherein the mask layer is made of GdFeCo in which Gd is contained in the range of 26 to 30 atom % and Co is contained in the range of 20 to 30 atom %.

5. A magneto-optical recording medium as set forth in claim 3, further comprising a nonmagnetic layer provided between the mask layer and the intermediate layer.

6. A magneto-optical recording medium as set forth in claim 5, wherein the nonmagnetic layer is composed of a material selected from the group consisting of SiN, $SiO_2$, AlN, C, ZnS—$SiO_2$, Al, AlTi, AlCr, Pt, Au, Ag, Si and Ge.

7. A magneto-optical recording medium as set forth in claim 3 further comprising a magnetic layer which has a direction of easy magnetization extending in an in-plane direction at room temperature and is exchanged-coupled to the mask layer.

8. A magneto-optical recording medium as set forth in claims 7, wherein the magnetic layer contains Gd.

9. A magneto-optical recording medium as set forth in claim 3, wherein three magnetic layers including the mask layer, the reproduction layer and the intermediate layer each contain Gd.

10. A reproduction method for a magneto-optical recording medium, the magneto-optical recording medium being a magnetic super resolution type magneto-optical recording disk of multilayer structure including at least a recording layer, an intermediate layer, a reproduction layer and a mask layer stacked in this order and having a plurality of recording tracks arranged at a predetermined track pitch in a radius direction, the mask layer exhibiting a Curie temperature higher than that of the recording, intermediate and reproduction layers, the reproduction method comprising;
   transferring data which is magnetically recorded in the recording layer of each track to the reproduction layer;
   scanning a track to be read with a light beam having a spot diameter larger than the track pitch under a state where a reproduction magnetic field is applied in a direction perpendicular to a surface of the disk such that the data in the track to be read is exchanged-coupled to a first reproduction aperture defined between two mask regions generated on the reproduction layer in front and behind along the track direction by temperature distribution through the light beam irradiation; and passina the data through a second reproduction aperture generated in the mask layer for controlling expansion of the first reproduction aperture in a disk radius direction, thereby reproducing the data.

11. A reproduction apparatus for a magneto-optical recording medium, the magneto-optical recording medium being a magnetic super resolution type magneto-optical recording disk of multilayer structure including at least a recording layer, an intermediate layer, a reproduction layer and a mask layer stacked in this order and having a plurality of recording tracks arranged at a predetermined track pitch in a radius direction, the mask layer exhibiting a Curie temperature higher than that of the recording, intermediate and reproduction layers, wherein the reproduction apparatus is used for transferring data which is magnetically recorded in the recording layer of each track to the reproduction layer, thereby reproducing the data, the reproduction apparatus comprising:

a mounting means connected with a driving mechanism for rotatably mounting the magneto-optical disk;

a magnetic field generating device for applying a reproduction magnetic field in a direction perpendicular to a surface of the mounted disk;

an optical system for irradiating a reproduction light beam having a spot diameter larger than the track pitch onto the mask layer side of the disk; and a signal processing means for detecting reflection of the reproduction light beam from the disk and modulating it to an electrical signal, wherein the reproduction apparatus reproduces data by scanning a track to be read with a light beam having a spot diameter larger than the track pitch under a state where a reproduction magnetic field is applied in a direction perpendicular to a surface of the disk such that the data in the track to be read is exchanged-coupled to a first reproduction aperture defined between two mask regions generated on the reproduction layer in front and behind along the track direction by temperature distribution through the light beam irradiation, and passing the data through a second reproduction aperture generated in the mask layer for controlling expansion of the first reproduction aperture in a disk radius direction.

* * * * *

UNITED STATES PATENT AND TRADEMARK OFFICE
CERTIFICATE OF CORRECTION

PATENT NO. : 6,770,387 B2
DATED : August 3, 2004
INVENTOR(S) : Tanaka et al.

Page 1 of 1

It is certified that error appears in the above-identified patent and that said Letters Patent is hereby corrected as shown below:

Column 17,
Line 6, delete "passina" and insert -- passing --.

Signed and Sealed this

Fourth Day of January, 2005

JON W. DUDAS
*Director of the United States Patent and Trademark Office*